United States Patent
Krippl et al.

(10) Patent No.: US 11,524,355 B2
(45) Date of Patent: Dec. 13, 2022

(54) METHOD FOR WELDING A WELDED PART TO A COMPONENT AND USE OF A WELDED PART

(71) Applicant: Bayerische Motoren Werke Aktiengesellschaft, Munich (DE)

(72) Inventors: Hermann Krippl, Wallersdorf (DE); Tuba Kurt, Loiching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 245 days.

(21) Appl. No.: 16/963,556

(22) PCT Filed: Dec. 3, 2018

(86) PCT No.: PCT/EP2018/083278
§ 371 (c)(1),
(2) Date: Jul. 21, 2020

(87) PCT Pub. No.: WO2019/145074
PCT Pub. Date: Aug. 1, 2019

(65) Prior Publication Data
US 2020/0353555 A1   Nov. 12, 2020

(30) Foreign Application Priority Data

Jan. 23, 2018   (DE) .................. 10 2018 201 000.5

(51) Int. Cl.
*B23K 9/20* (2006.01)
*B23K 9/23* (2006.01)
(Continued)

(52) U.S. Cl.
CPC ............... *B23K 9/201* (2013.01); *B23K 9/23* (2013.01); *B23K 35/0288* (2013.01);
(Continued)

(58) Field of Classification Search
CPC ...... B23K 9/201; B23K 9/23; B23K 35/0288; B23K 2103/04; B23K 2101/18; B23K 2101/006
See application file for complete search history.

(56) References Cited

U.S. PATENT DOCUMENTS

| | | | |
|---|---|---|---|
| 6,079,607 A | 6/2000 | Nichter | |
| 2006/0118527 A1* | 6/2006 | Schmitt | B23K 9/20 219/99 |

(Continued)

FOREIGN PATENT DOCUMENTS

| | | |
|---|---|---|
| CN | 102216018 A | 10/2011 |
| CN | 102216019 A | 10/2011 |

(Continued)

OTHER PUBLICATIONS

Machine translation of DE-102015209203, Baskaya, Method and welding device for lift-ignition welding, 2016 (Year: 2016).*

(Continued)

*Primary Examiner* — Brian W Jennison
*Assistant Examiner* — Abigail H Rhue
(74) *Attorney, Agent, or Firm* — Crowell & Moring LLP

(57) ABSTRACT

A method for welding a welded part to a component is carried out as arc ignition welding by use of direct current, having a bias current phase in which an arc is formed between the negatively polarized welded part and the component, and a subsequent main current phase for melting material to the joint. The welded part: a) is a galvanized sphere made of C10C having a roundness G500, wherein the size of any zinc inclusions under the surface of the sphere equals 10 micrometers at maximum, or b) is formed by welding a galvanized sphere made of C10C having a round- (Continued)

ness G500, wherein the size of any zinc inclusions under the surface of the sphere equals 10 micrometers at maximum, to a connection element.

14 Claims, 2 Drawing Sheets

(51) Int. Cl.
  *B23K 35/02* (2006.01)
  *B23K 101/18* (2006.01)
  *B23K 103/04* (2006.01)
  *B23K 101/00* (2006.01)
(52) U.S. Cl.
  CPC .... *B23K 2101/006* (2018.08); *B23K 2101/18* (2018.08); *B23K 2103/04* (2018.08)

(56) References Cited

U.S. PATENT DOCUMENTS

| | | |
|---|---|---|
| 2010/0230389 A1 | 9/2010 | Hsu et al. |
| 2013/0105448 A1 | 5/2013 | Schmitt et al. |
| 2013/0134135 A1* | 5/2013 | Mantei ................. B23K 11/115 219/80 |
| 2014/0294488 A1 | 10/2014 | Van Niekerk et al. |

FOREIGN PATENT DOCUMENTS

| | | | |
|---|---|---|---|
| CN | 102933346 A | 2/2013 | |
| DE | 832 929 C | 3/1952 | |
| DE | 10 2012 203 217 A1 | 9/2013 | |
| DE | 10 2013 225 495 A1 | 6/2015 | |
| DE | 102013225495 A1 * | 6/2015 | ......... B23K 37/0229 |
| DE | 10 2015 209 203 A1 | 11/2016 | |
| DE | 102015209203 A1 * | 11/2016 | |
| DE | 10 2015 211 814 A1 | 12/2016 | |
| EP | 1 354 659 A2 | 10/2003 | |
| JP | 2016-28824 A | 3/2016 | |
| WO | WO 2016/184668 A1 | 11/2016 | |

OTHER PUBLICATIONS

Machine translation of DE-102013225495, Hammer, Method and device for stud welding with a stud welding head without joining drive device, 2015 (Year: 2015).*
Chinese-language Office Action issued in Chinese Application No. 201880079594.6 dated Aug. 6, 2021 with English translation (five (5) pages).
International Search Report (PCT/ISA/210) issued in PCT Application No. PCT/EP2018/083278 dated Mar. 14, 2019 with English translation (four (4) pages).
German-language Written Opinion (PCT/ISA/237) issued in PCT Application No. PCT/EP2018/083278 dated Mar. 14, 2019 (five (5) pages).
German-language Search Report issued in German Application No. 10 2018 201 000.5 dated Jul. 8, 2020 with partial English translation (10 pages).
Chinese-language Office Action issued in Chinese Application No. 201880079594.6 dated Apr. 23, 2021 with English translation (16 pages).

* cited by examiner

METHOD FOR WELDING A WELDED PART TO A COMPONENT AND USE OF A WELDED PART

BACKGROUND AND SUMMARY OF THE INVENTION

The invention relates to a method for welding a welded part to a component and to the use of a welded part in a welding method.

The document DE 10 2015 211 814 A1 discloses a method for welding a ball to a component. The method operates on the principle of resistance welding, i.e. the ball is pressed onto the component and an electric voltage is applied, so that an electric current flows between the ball and the component. As a result, material in the region of the contact point melts and the ball is welded to the component.

If such ball-component connections are to be used in automobile construction, a low error tolerance of the joining process is essential. In particular for use in mass production, it is important that the welded connection has the necessary strength and can be reliably produced repeatedly. In mass production, joining methods are preferably carried out in automated production sequences. Here it is desirable that the reliability of the joining process not only applies to the welded parts of one batch, but is also maintained after a change of batch.

Against this background, the object of the present invention is to provide a possible way in which a ball-component connection can be produced in a way suitable for mass production.

The object is achieved by a method for welding a welded part to a component and by the use of a welded part, according to the claimed invention.

The method according to the invention is a method for drawn arc welding with DC current, in which a welded part is welded to a component. For this purpose, the welded part is placed on the component at a joining point. In a preweld current phase, a low preweld current is switched on and flows through the welded part and the component. The welded part is removed to a predetermined distance from the component. This brings about the formation of a weak arc. This is followed by the main current phase, in which the preweld current is increased to a main current (welding current). The resultant welding arc causes at least partial melting of the materials of the welded part and the component. To end the method, the welded part is lowered onto the component or is immersed a short way into the component and the current is switched off. The melted materials cool down to form a material-bonding welded connection. In drawn arc welding with DC current, the direction of flow of the current is not changed during the method.

According to the invention, the welded part is therefore negatively polarized. It is of central importance for the welding process according to the invention that the welded part consists either of a galvanized ball of C10C with a roundness of G500, in the case of which the size of any zinc inclusions below the surface of the ball is a maximum of 10 micrometers, or that the welded part has been produced by welding such a ball to a connecting element. Such a welded part consequently includes a ball portion formed by the galvanized ball. In the subsequent drawn arc welding method, the welded connection between the component and the ball or the component and the ball portion of the welded part that is formed by the ball is formed.

If the welded part is formed by a galvanized ball of C10C with a roundness of G500, in the case of which the size of any zinc inclusions below the surface of the ball is a maximum of 10 micrometers, being welded to a connecting element by means of welding methods, the connecting element may be for example studs, threaded studs, rivets or the like.

In a preferred exemplary embodiment, the welded part is a double ball, which is formed by a galvanized ball of C10C with a roundness of G500, in the case of which the size of any zinc inclusions below the surface of the ball is a maximum of 10 micrometers, being welded to a further ball, preferably just such a ball. Various types of welding methods, such as for example laser welding or drawn arc welding, may be used for producing the welded part.

The balls are formed from the material C10C, this designation referring to a grade of steel with the material number 1.0214. The assessment of the chemical composition of the base material is in compliance with DIN EN 10263-2.

The roundness is designated in conformity with DIN 5401. After galvanizing of the surface of the ball, the ball has a roundness of G500.

Below the surface of the ball formed by the zinc layer, only zinc inclusions with a size of a maximum of 10 micrometers may be present in the balls. In order to ensure this, it may be advantageous if the material C10C has a degree of purity in accordance with DIN 10247/2007-07 of K3≤15. Furthermore, in a preferred refinement, it may be advantageous in this respect if, before galvanizing, the balls have a roundness of G100 and preferably a maximum roughness of Ra=0.1 and possibly Ra=0.06 and are subsequently electrocoated. The galvanized balls should advantageously still have a core hardness of 220 HV10±30 and a surface hardness of 220 HV10±30.

During the welding operation, a dome-shaped surface of the galvanized ball or of the ball portion of the welded part is facing the component. It was to be expected that the arc moving over the domed surface in an uncontrolled and haphazard manner would result in a welding process that is difficult to monitor and difficult to control. However, it has surprisingly been found in tests that, when a welded part as described above is used in the DC current drawn arc method described, this provides a welding process that can be controlled well and is distinguished by great reproducibility and strength of the welding results. It is presumed that in particular the haphazard movement of the arc over the dome-shaped surface of the welded part, together with the direction of flow of the welding current, the roundness and the base material of the ball and also the limitation of the size of the zinc inclusions, leads to a particularly complete and low-spatter burning of the zinc content, without explosive zinc eruptions, and uniform melting of the base material, whereby in turn the strength of the welded connection increases. In tests, it was also possible to demonstrate the quality of the welding results for balls of different production batches. As long as the balls satisfied the requirements described above, it was not necessary for the welding parameters to be adapted after a change of batch, or only to a slight extent. Consequently, the welding method described is suitable in particular for use in (mass) production in vehicle construction.

The advantageous effect described can be observed to an even greater degree when a thickness of the zinc layer of the galvanized ball lies in the range of 6 to 12 micrometers. Using balls with such a thickness of the zinc layer made it entirely possible to produce welded connections with a strength that satisfies the requirements in vehicle construction.

The welded parts can in principle be welded to any component that is suitable on the basis of its material composition for welding to the galvanized ball described above. It is particularly preferred, however, to weld the welded parts to a sheet metal component, and in particular to a sheet steel component. Components that have been produced from a steel sheet provided with a corrosion protection layer, such as for example a galvanized steel sheet, should also be considered to be a steel sheet component. The steel sheets may preferably have a thickness in the range from 0.5 mm to 3 mm.

Particularly preferably, the components are body components of a motor vehicle, even though the method and the use are not intended to be restricted to such components. The welded parts welded to the component may be subsequently used for example for aligning, temporarily fixing or permanently fastening further components, such as for example body (styling) parts.

The drawn arc welding method may be carried out with a drawn arc welding device known to a person skilled in the art. In a refinement, the drawn arc welding is carried out in such a way that a single main current value is predetermined in the main current phase. To be more precise, the welding current is raised to the predetermined main current value at the beginning of the main current phase and is only reduced again at the end of the welding. The main current phase lasts for a predetermined welding time. This way of conducting the method is referred to from now on as "one main-current phase welding" and may be particularly advantageous for welding welded parts to components with a thickness in the range between 0.7 mm and 1.5 mm or for welding double balls to components.

For the welding of welded parts that consist of the ball described above, it has additionally been found to be particularly advantageous to conduct the method in such a way that the main current phase has three successive main current subphases, in which different main current values are respectively used. The preweld current phase is followed by a first main current subphase, in which a first main current value is set. This is followed by a second main current subphase, in which a second main current value, which is reduced in comparison with the first main current, is set. The second main current subphase is followed by a third main current subphase, in which a third main current value, which is lower than the first main current value and higher than the second main current value, is set.

The three main current subphases are in this case given different tasks. In the first main current subphase, a relatively high first main current value is used in order to evaporate the zinc and the zinc inclusions that are possibly present in the ball. This takes place relatively quickly, so that the welding time of the first subphase can be chosen to be short.

In order to avoid overheating of the melt of the base materials forming in the first main current subphase, the first main current subphase is followed by the second main current subphase with a low second main current value. The second main current value however still lies well above the preweld current value from the preweld current phase, for example by a factor of 2. The overheating can already be avoided if this second subphase only has a small time duration. In the then-following third main current subphase, the necessary welding energy for the welding is introduced. Correspondingly, the main current value is raised again, though not to the value of the first main current subphase. The third main current subphase has the longest time duration of the three main current subphases.

For conducting the method with three main current subphases, it has been found to be particularly advantageous if the first, second and third main current values and the associated time durations of the subphases lie in the ranges of values described below. The figures given relate here to a reference main current value and a reference time. The reference main current value indicates that main current value and the reference time indicates that welding time that would be determined and used for a "one main-current phase welding" of the same welded part and the same component in order to achieve properly performed welding. Compared with these reference values, the first main current value should be preferably 130% to 150% and in particular 140% of the reference main current value and the time duration of the first main current subphase should be preferably 10% to 15% and in particular 12.5% of the reference time. The second main current value should be preferably 23% to 43% and in particular 33% of the reference main current value and the time duration of the second main current subphase should be preferably 10% to 15% and in particular 12.5% of the reference time. The third main current value should be preferably 70% to 90% and in particular 80% of the reference main current value and the time duration of the third main current subphase should be 50% to 70% and in particular 60% of the reference time.

In the case of (steel) sheets with a thickness in the thin sheet range of up to 0.7 mm and in the thick sheet range of from 1.5 mm, conducting the method in such a way with three main current subphases achieves outstanding results, which can be rated as better with regard to strength and reproducibility than comparable weldings with "one main-current phase welding".

Also provided is the use of a ball galvanized as described above of C10C with a roundness of G500, the size of any zinc inclusions below the surface of the ball being a maximum of 10 micrometers, in the described method for drawn arc welding.

Similarly provided is the use in the method described above of a welded part that is formed by the welding of a ball galvanized as described above of C10C with a roundness of G500, in which the size of any zinc inclusions below the surface of the ball is a maximum of 10 micrometers, to a connecting element. The connecting element may be for example a stud, a threaded stud or a rivet. In particular, the connecting element may be a further ball galvanized as described above of C10C with a roundness of G500, in which the size of any zinc inclusions below the surface of the ball is a maximum of 10 micrometers.

Further advantages, features and details of the invention are provided by the following description, in which exemplary embodiments of the invention are described in detail with reference to the drawings.

The features mentioned in the claims and in the description may each be essential to the invention individually on their own or in any desired combination. Where the term "can" or "may" is used in this application, it relates both to the technical possibility and to the actual technical implementation.

Exemplary embodiments are explained below on the basis of the accompanying drawings.

DETAILED DESCRIPTION OF THE DRAWINGS

Figure 1:
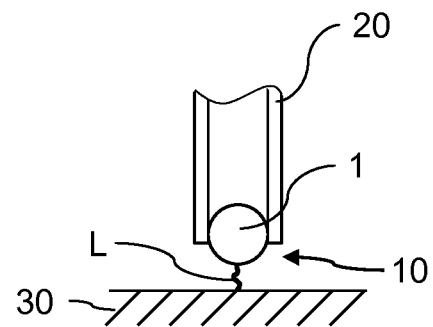
FIGS. 1 and 2 show schematic representations of welded parts that are welded to a component by way of drawn arc welding.
Figure 2:
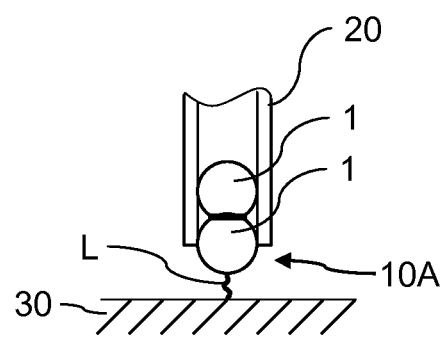

FIGS. 1 and 2 each show a welded part 10, which has been received in a drawn arc welding device 20, for use in the method.

First, the welded part 10 is placed on a component 30 by means of the drawn arc welding device 20. The component 30 may be for example a sheet steel component for a motor vehicle. The welded part 10 and the component 30 are connected to a welding current source (not represented), the welded part 10 being negatively polarized. Then, the welded part 10 is lifted off the component 30 by means of the drawn arc welding device 20, while a preweld (bias) current is passed through both, causing an arc L to be ignited. In the then-following main current phase, the current that flows between the welded part 10 and the component 30 is increased. As a result, welding of the base material of the component 30 and of the welded part 10 occurs. After a predetermined welding time, the welded part 10 is lowered again and pressed into the melt. After cooling down of the same, a material-bonding connection is obtained.

According to FIG. 1, a galvanized ball 1 of C10C with a roundness of G500, the size of any zinc inclusions below the surface of the ball being a maximum of 10 micrometers, is used as the welded part 10. FIG. 2 shows a further welded part 10A in the form of a double ball, which is formed by welding a galvanized ball 1 of C10C with a roundness of G500, the size of any zinc inclusions below the surface of the ball being a maximum of 10 micrometers, to a second such ball 1. Further alternative welded parts, which are not depicted, may be formed for example by a ball 1 that is welded to a connecting element, such as for example a stud, a threaded stud or a rivet. In any event, the welding between the welded part and the component is performed by the ball 1 being placed on the component.

Figure 3:
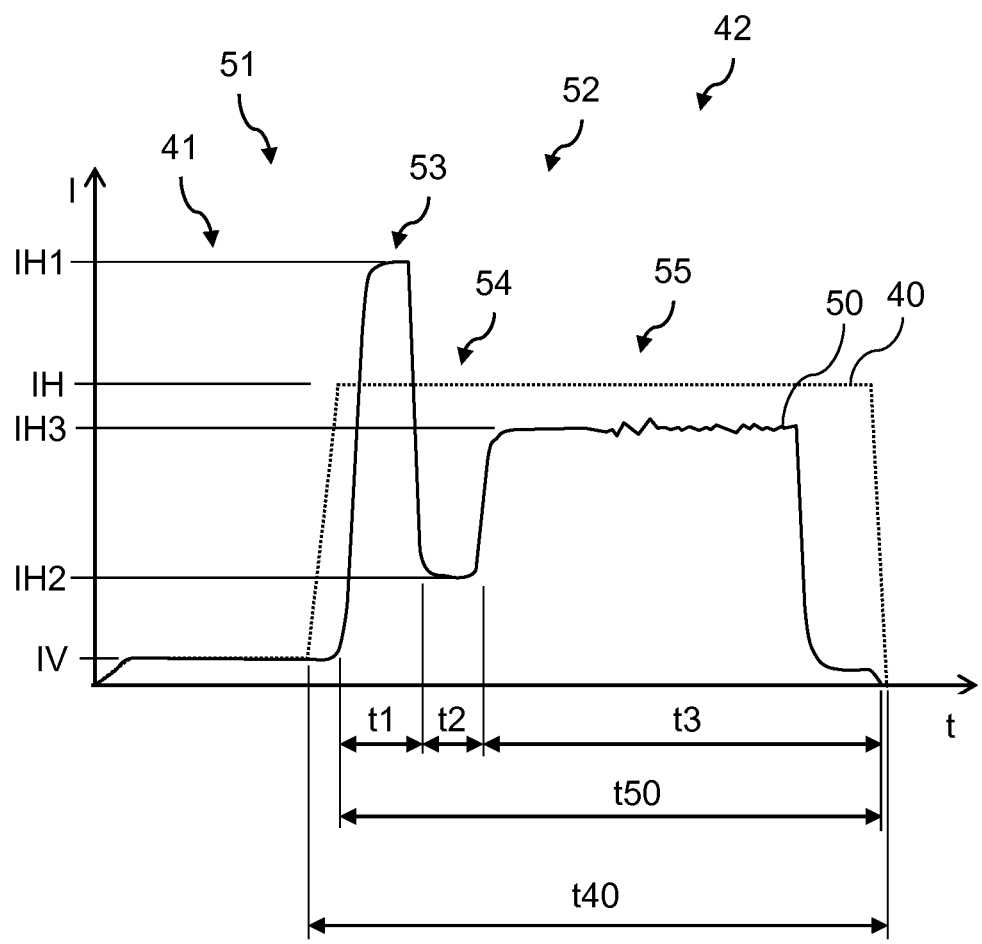
FIG. 3 shows welding characteristics, given by way of example, for carrying out the method.

FIG. 3 shows two welding characteristics 40, 50, given by way of example, of drawn arc weldings for welding a welded part 10, which consists of a ball 1, to the component 30. The diagram in this case plots the welding current I over time t.

The welding characteristic 40 represented by dashed lines in FIG. 3 reproduces a welding method such as that described with reference to FIG. 1. Such a welding method, referred to in the context of this application as "one main-current phase welding", has, following a preweld current phase 41, a main current phase 42, with a single main current value IH, which is predetermined as constant for the duration of the main current phase 42.

In particular for the welding of the ball 1 to a thin sheet of 1.5 mm in thicknesss or less, the welding characteristic provided with the reference sign 50 in FIG. 3 is suitable. This way of conducting the method is distinguished by the fact that the main current phase 52 is divided into three main current subphases 53, 54 and 55, in which welding is respectively performed with different main current values IH1, IH2, IH3.

After a preweld current phase 51, the current is raised to a first main current value IH1 in a first main current subphase 53. In the subsequent second main current subphase 54, the main current is lowered to a second main current value IH2, which however is still above the value of the preweld current IV. In the last, third main current subphase 55, the current is raised again, the third main current value IH3 lying between the first main current value IH1 and the second main current value IH2. The first and second main current subphases 53, 54 each only last a very short time; the energy input for melt formation mainly takes place in the third main current subphase 55, which correspondingly lasts a longer time.

Also indicated in FIG. 3 are the welding durations of the entire main current phase for the "one main-current phase welding" (characteristic 40, reference sign t40) and for the welding with three main current subphases (characteristic 50, reference sign t50). If the welding time t40 and the main current value IH of the characteristic 40 are considered as reference values, the first main current value IH1 should be preferably 130% to 150% and in particular 140% of the reference main current value IH and the time duration t1 of the first main current subphase 53 should last preferably 10% to 15% and in particular 12.5% of the reference time t40. The second main current value IH2 should be preferably 23% to 43% and in particular 33% of the reference main current value IH and the time duration t2 of the second main current subphase 54 should last preferably 10% to 15% and in particular 12.5% of the reference time t40. The third main current value IH3 should be preferably 70% to 90% and in particular 80% of the reference main current value IH and the time duration t3 of the third main current subphase 55 should last 50% to 70% and in particular 60% of the reference time t40.

LIST OF REFERENCE SIGNS

1 Ball
10, 10A Welded part
20 Drawn arc welding device
30 Component
40 Welding characteristic
41 Preweld current phase
42 Main current phase
50 Welding characteristic
51 Preweld current phase
52 Main current phase
53, 54, 55 Main current subphases
I Current
IH, IH1, IH2, IH3 Main current value
IV Preweld current value
t Time
t1, t2, t3 Time duration of the main current subphase
t40, t50 Welding duration of the main current phase

What is claimed is:

1. A method for welding a welded part to a component, which is carried out as drawn arc welding with DC current, the method comprising:
   a preweld current phase, in which an arc is formed between a negatively polarized welded part and the component; and
   a subsequent main current phase for melting material at a joining point,
   wherein the welded part:
   a) comprises a galvanized ball of C10C with a roundness of G500, in which a size of any zinc inclusions below a surface of the ball is a maximum of 10 micrometers, or
   b) is formed by the welding of a galvanized ball of C10C with a roundness of G500, in which a size of any zinc inclusions below a surface of the ball is a maximum of 10 micrometers, to a connecting element.

2. The method according to claim 1, wherein the welded part is formed as a double ball by welding of a galvanized ball of C10C with a roundness of G500, in which the size of any zinc inclusions below the surface of the ball is a maximum of 10 micrometers, to a second such galvanized ball.

3. The method according to claim 1, wherein the material C10C of the galvanized ball has a degree of purity in accordance with DIN 10247/2007-07 of K3≤15.

4. The method according to claim 1, wherein a ball that has a roundness of G100 before coating to form a zinc layer is used as the galvanized ball.

5. The method according to claim 1, wherein a thickness of a zinc layer of the galvanized ball lies in the range from 6 to 12 micrometers.

6. The method according to claim 1, wherein the component is a sheet steel component.

7. The method according to claim 1, wherein the component is a body component of a motor vehicle.

8. The method according to claim 1, wherein a single main current value is predetermined during the main current phase and the main current phase lasts for a predetermined welding time.

9. The method according to claim 1, wherein the welded part is the galvanized ball, and the main current phase has three successive main current subphases, wherein
 a first main current value is predetermined in the first main current subphase,
 a second main current value, which is reduced in comparison with the first main current value, is predetermined in the second main current subphase, and
 a third main current value, which lies between the first main current value and the second main current value, is predetermined in the subsequent third main current subphase.

10. The method according to claim 9, wherein the first main current value is 130% to 150% of a reference main current value and the time duration of the first main current subphase is 10% to 15% of a reference time,
the second main current value is 23% to 43% of the reference main current value and the time duration of the second main current phase is 10% to 15% of the reference time, and
the third main current value is 70% to 90% of the reference main current value and the time duration of the third main current phase is 50% to 70% of the reference time,
wherein the reference main current value and the reference time correspond to the main current value and the welding time that would be predetermined for a welding of the galvanized ball to a sheet steel component.

11. The method according to claim 10, wherein the first main current value is 140% of a reference main current value and the time duration of the first main current subphase is 12.5% of a reference time,
the second main current value is 33% of the reference main current value and the time duration of the second main current phase is 12.5% of the reference time, and
the third main current value is 80% of the reference main current value and the time duration of the third main current phase is 60% of the reference time,
wherein the reference main current value and the reference time correspond to the main current value and the welding time that would be predetermined for a welding of the galvanized ball to a sheet steel component.

12. The method according to 9, wherein the component is a thin sheet with a sheet thickness of 0.7 mm or less or a thick sheet with a sheet thickness of 1.5 mm or greater.

13. Use of a welded part in a method for drawn arc welding according to claim 1, wherein
the welded part comprises the galvanized ball of C10C with a roundness of G500, in which the size of any zinc inclusions below the surface of the ball is a maximum of 10 micrometers.

14. Use of a welded part in a method for drawn arc welding according to claim 1, wherein
the welded part is formed by the welding of a galvanized ball of C10C with a roundness of G500, in which the size of any zinc inclusions below the surface of the ball is a maximum of 10 micrometers, to a further galvanized ball of C10C with a roundness of G500, in which the size of any zinc inclusions below the surface of the ball is a maximum of 10 micrometers.

\* \* \* \* \*